United States Patent [19]

Falline et al.

[11] Patent Number: 5,017,634

[45] Date of Patent: * May 21, 1991

[54] LACQUER COATINGS FOR POLYURETHANE-MOLDED ARTICLES

[75] Inventors: Brian J. Falline; Bruce W. Weihrauch, both of Moline, Ill.

[73] Assignee: Moline Paint Manufacturing Co., Moline, Ill.

[ * ] Notice: The portion of the term of this patent subsequent to Aug. 8, 2006 has been disclaimed.

[21] Appl. No.: 377,462

[22] Filed: Jul. 10, 1989

Related U.S. Application Data

[63] Continuation-in-part of Ser. No. 244,553, Sep. 12, 1988, Pat. No. 4,855,347, which is a continuation of Ser. No. 912,766, Sep. 26, 1986, abandoned.

[51] Int. Cl.$^5$ .................... C08K 5/54; C08L 75/06
[52] U.S. Cl. .................... 524/267; 524/315; 524/376; 524/390; 524/590; 264/46.6; 264/308
[58] Field of Search .................... 524/267, 590

[56] References Cited

U.S. PATENT DOCUMENTS

| | | |
|---|---|---|
| 3,186,964 | 6/1965 | Kookootsedes et al. . |
| 3,551,375 | 12/1970 | Dumoulin et al. . |
| 3,893,868 | 7/1975 | Klement et al. . |
| 4,282,285 | 8/1981 | Mohiuddin . |
| 4,312,672 | 1/1982 | Blahak et al. . |
| 4,478,893 | 10/1984 | Schonfelder et al. . |
| 4,855,347 | 8/1989 | Falline .................... 524/267 |

*Primary Examiner*—C. Warren Ivy
*Attorney, Agent, or Firm*—Woodard, Emhardt, Naughton Moriarty & McNett

[57] ABSTRACT

An in-mold lacquer coating for producing a polyurethane-based molded article. The lacquer coating is mold-releasable without the aid of an external mold release agent, is re-coatable after de-molding without additional surface preparation, and comprising a mixture of a pre-reacted aliphatic polyurethane resin, a polydimethylsiloxane fluid mold-release agent, and an aromatic, acetate and alcoholic solvent system that is incompatible with the polydimethylsiloxane and that has constituents with specific gravities less than the polydimethylsiloxane and with varying rates of evaporation such that the ratio of aromatic to acetate and alcoholic solvents decreases as the solvent system evaporates.

12 Claims, No Drawings

LACQUER COATINGS FOR POLYURETHANE-MOLDED ARTICLES

REFERENCE TO RELATED APPLICATIONS

This application is continuation-in-part of patent application Ser. No. 244,553, filed Sept. 12, 1988, now U.S. Pat. No. 4,855,347, as a continuation of our patent application Ser. No. 912,766, filed Sept. 26, 1986, now abandoned.

FIELD OF THE INVENTION

The disclosed invention relates generally to lacquer coatings for the in-mold surface coating of polyurethane-molded parts, and more specifically to improved lacquer coatings that are completely mold releasable when applied directly to the surface of a mold without the prior application of an external mold release agent, and are re-coatable when de-molded without the necessity of surface preparation.

BACKGROUND OF THE INVENTION

Molds used in the production of lacquered polyurethane-molded articles, such as those used to mold lacquered polyurethane foam articles, have heretofore been pre-treated with a thin layer of an external mold release agent applied directly to the mold surface before a layer of a lacquer coating is applied to the mold. These steps have been followed by the injection into the mold of a desired polyurethane-based plastic. After the polyurethane-based plastic cures sufficiently within the mold, the mold is opened and the molded article is removed, or "de-molded." Such external mold release agents have provided for the complete release of the lacquer coating from the surface of the mold allowing the lacquer coating to be removed from the mold intact with the molded article. Examples of external mold release agents known in the prior art include tetrafluoroethylene, waxes dissolved in solvents, and silicon compounds.

However, the use of external mold release agents has been shown to have one or both of the following disadvantages. It is known that a thin coating of external mold release agent is invariably present on the surface of the lacquer coating after de-molding. This thin coating of external mold release agent can be present in sufficient amounts to prevent adhesion of a second coat of lacquer upon the first lacquer coat unless the mold release agent residue is removed by time-consuming and costly procedures. Providing such a second coat of lacquer to the molded article is often commercially desirable for either an improved exterior gloss, or to provide additional colors for detailing, decoration, printing or designs. Secondly, it is also known that thin layers of external mold release agent may remain on the mold surface after each production cycle, which over many production cycles builds to the point of requiring removal, resulting in undesirable production interruption.

It is also known to incorporate mold release agents or mold release catalysts directly into the in-mold lacquer coatings used in the production of polyurethane-molded articles. These internal mold release agents and catalysts of the prior art assertedly provide a mold release function within the lacquer coating itself, doing away with the need for external mold release agents, while also providing for re-coatability of the lacquer coating without the necessity of cleaning residues from the surface of the initial lacquer coating.

However, heretofore it has not been known to incorporate silicon-based mold release agents directly into lacquer coatings for use in the production of polyurethane-molded articles without first reacting such silicon-based compounds with other constituents to render the silicon compounds suitable for use as mold release agents. In U.S. Pat. No. 4,478,893, issued to Schonfelder et al., for example, there is disclosed polyisocyanate addition products useful as mold release agents in the production of molded lacquer coated plastics by the in-mold coating process. This reference discloses the use of polysiloxanes that have isocyanate reactive end groups and that are difunctional in isocyanate addition reactions as starting materials that must be further reacted with an excess of polyisocyanate and an alcohol, or amine, to produce the internal mold release agent disclosed in Schonfelder et al. Indeed, in Example 35 (comparative example) of Schonfelder et al., it is taught that a technically simple and nonspecialty polydimethylsiloxane compound, that is one without isocyanate reactive end groups and one that has not been further reacted in the manner taught in Schonfelder et al., is not suitable as a mold release agent for in-mold lacquer coatings.

The lacquer coatings of the present invention include an effective amount of a polydimethylsiloxane fluid that functions as an internal mold release agent to provide a complete mold release function, but which is present in an ineffective amount to prevent the adhesion of a second coating of the same or similar lacquer coating after de-molding. The lacquer coatings of the present invention therefore provide for the effective use of a silicon compound as an internal mold release agent of the type the prior art teaches is not suitable as a mold release agent for use in in-mold lacquer coatings.

SUMMARY OF THE INVENTION

One embodiment of the present invention is an in-mold lacquer coating for a polyurethane-molded article, which coating is mold-releasable without the aid of an external mold release agent and is re-coatable after de-molding without additional surface preparation, comprising a mixture of a fully-reacted aliphatic polyurethane resin, a polydimethylsiloxane fluid, and a solvent system that is incompatible with the polydimethylsiloxane, having toluene, an acetate solvent, a glycol ether solvent, and alcohol solvents as discrete constituents thereof, which constituents have specific gravities less than said polydimethylsiloxane and have varying rates of evaporation such that the ratio of toluene to the alcohol, glycol ether, and acetate solvent constituents in the solvent system decreases as the constituents of the solvent system evaporate.

Another embodiment of the present invention is an in-mold lacquer coating for a polyurethane-molded article, which coating is mold-releasable without the aid of an external mold release agent and is re-coatable after de-molding without additional surface preparation, comprising a mixture of a fully-reacted aliphatic polyurethane resin present in about 3.0 to 17.0 weight percent, a polydimethylsiloxane fluid present in about 0.15 to 1.15 weight percent, and a solvent system that is incompatible with the polydimethylsiloxane, having toluene present in about 15.0 to 60.0 weight percent, ethyl acetate present in about 2.0 to 25.0 weight percent, methanol present in about 1.0 to 30.0 weight percent, isopropanol present in about 15.0 to 50.0 weight percent, ethylene glycol monobutyl ether present in about 0.0 to 15.0 weight percent, and propoxypropanol present in about 0.00 to 20.0 weight percent as discrete constituents thereof, which constituents have specific gravities less than the polydimethylsiloxane and have varying rates of evaporation such that the ratio of toluene to the acetate and alcohol solvent constituents in the solvent system decreases as the constituents of the solvent system evaporate.

Another embodiment of the present invention is an in-mold lacquer coating for a polyurethane-molded article, which coating is mold-releasable without the aid of an external mold release agent and is re-coatable after de-molding without additional surface preparation, comprising a mixture of a fully-reacted aliphatic polyurethane resin, a polydimethylsiloxane fluid, and a solvent system that is incompatible with the polydimethylsiloxane, having toluene, an acetate solvent, and alcohol solvents as discrete constituents thereof, which constituents have specific gravities less than the polydimethylsiloxane and have varying rates of evaporation such that the ratio of toluene to the acetate and alcohol solvent constituents in the solvent system decreases as the constituents of the solvent system evaporate.

It is an object of the present invention to provide an in-mold lacquer coating for polyurethane-based molded articles that is mold releasable without the aid of an external mold release agent and that is re-coatable with the same or other lacquer coating without surface preparation.

It is an object of the present invention to provide an in-mold lacquer coating for polyurethane-based molded articles that includes a technically simple silicon compound as the internal mold-release agent.

Related objects and advantages of the novel lacquer coating of the present invention will be evident from the following detailed description.

DESCRIPTION OF THE PREFERRED EMBODIMENTS

For the purposes of promoting an understanding of the principles of the invention, reference will now be made to the preferred embodiments of the invention and specific language will be used to describe the same. It will nevertheless be understood that no limitation of the scope of the invention is thereby intended, such alterations and further modifications in the described invention, and such further applications of the principles of the invention as described therein being contemplated as would normally occur to one skilled in the art to which the invention relates.

The present invention provides novel lacquer coatings suitable for use as in-mold coatings for polyurethane-molded articles, which coatings release cleanly from the interior surface of the article mold without the aid of an external mold release agent, and which coatings are re-coatable with the same or similar lacquer coatings after de-molding of the article without additional surface preparation of the first lacquer coating.

A preferred embodiment of the lacquer coatings of the present invention comprises a mixture of a pre-reacted aliphatic polyurethane resin, a technically simple polydimethylsiloxane fluid as the internal mold-release agent, and an aromatic, acetate, glycol ether, and alcoholic solvent system. This preferred embodiment has been prepared to date utilizing readily available starting materials.

Preferable pre-reacted aliphatic polyurethane resins are polyester resins that have been pre-reacted with aliphatic isocyanate in the presence of alcohol to produce aliphatic polyurethane resins of sufficient molecular weight to provide desirable ultra violet stability. A preferred pre-reacted aliphatic polyurethane resin in work done to date has been a polyester extended aliphatic urethane elastomer resin, such as, for example, the resin marketed commercially as Spenlite Urethane L89-30S made by N.L. Chemicals of Hightstown, N.J., which has been typically available as about 20–30 weight percent resin in a coequal mixture of toluene and isopropanol. Spenlite L89-30S is a fully reacted, nonyellowing elastomeric urethane solution with medium hardness, which dries by solvent evaporation to produce a tough elastomeric film. Spenlite L89-30S contains no unreacted diisocyanate monomer. While Spenlite L89-30S has been the preferred pre-reacted aliphatic polyurethane resin in work completed to date, other suitable resins are now available and may be developed that would also function effectively in the lacquer coatings of the present invention, and are considered within the scope and breadth of the disclosure and claims herein. In work completed to date, the preferred polyester extended aliphatic urethane elastomer resin has been preferably present in about 3.0% to 17% by weight of the lacquer coating, more preferably present in about 7.0% to 10.0%, and most preferably in about 6.56% by weight.

The preferred polyester extended aliphatic urethane elastomer resin has been, in turn, mixed with isopropanol and toluene, which are two of the preferred alcoholic and aromatic constituents of the solvent system of the preferred embodiment, in sufficient quantities such that isopropanol has been preferably present in about 15% to 50% by weight of the lacquer coating, and most preferably in about 29.52% by weight, and toluene has been preferably present in about 15% to 60% by weight of the lacquer coating, and most preferably in about 43.44% by weight.

To this resulting mixture has been added, under agitation, the remaining preferred constituents of the solvent system of the preferred embodiment, those being methanol, which has been preferably present in about 1.0% to 30% by weight of the lacquer coating, and most preferably in about 3.58% by weight; and the following slower evaporating constituents: propoxypropanol, which has been preferably present in about 0.0% to 20% by weight of the lacquer coating, and most preferably in about 3.08% by weight; ethyl acetate, which has been preferably present in about 2.0% to 25% by weight of the lacquer coating, and most preferably in about 10.14% by weight; and ethylene glycol monobutyl ether, which has been preferably present in about 0.0% to 15% by weight of the lacquer coating, and most preferably in about 3.08% by weight. The resulting mixture is a clear urethane lacquer intermediate.

To this intermediate has been added, under agitation, a polydimethlysiloxane fluid that has a specific gravity greater than the specific gravity of any constituent of the solvent system of the preferred embodiment of the present invention. The preferred polydimethlysiloxane fluid in work completed to date has been Dow Corning DC-200 Polydimethyl Siloxane Silicon Fluid made by Dow Corning Corporation of Midland, Mich., which has a specific gravity greater than any of toluene, isopropanol, methanol, ethylene glycol monobutyl ether, ethyl acetate, or propoxypropanol. Dow-Corning-200 fluids are medium viscosity polydimethylsiloxane polymers manufactured to yield essentially linear polymers with average kinematic viscosities ranging from 50 to 1000 c St. Linear polydimethylsiloxane polymers characteristically have the following typical chemical composition: $(CH_3)_3SiO[SiO(CH_3)_2]_nSi(CH_3)_3$. Preferably the preferred polydimethlysiloxane fluid is present in about 0.15% to 1.15% by weight, and most preferably in about 0.60% by weight of the lacquer coating as a whole.

The resulting mixture is the preferred lacquer coating of the present invention, with constituents of the approximate preferred weight percentages listed in Table 1, below:

TABLE 1

| | |
|---|---|
| Polyester Extended Aliphatic Urethane Elastomer | 6.56% |
| Polydimethylsiloxane Fluid | .60% |
| Solvent System (Total): | 92.84% |
| Toluene | 43.44% |
| Isopropanol | 29.52% |
| Methanol | 3.58% |
| Ethylene Glycol Monobutyl Ether | 3.08% |
| Ethyl Acetate | 10.14% |
| Propoxypropanol | 3.08% |

The preferred polydimethylsiloxane of the preferred embodiment is soluble in aromatic solvents, such as toluene, for example. It has heretofore been believed that silicon compounds that are not soluble in toluene are not satisfactory mold release agents because of reported difficulties that have been encountered in using non-toluene-soluble silicons and because of their reported poor mold release performances. Because of the relatively high level of toluene in the preferred embodiment of the lacquer coatings of the present invention, it would be expected that the preferred polydimethylsiloxane would be easily soluble in the toluene constituent and would therefore be expected to be an effective mold release agent. However, it was discovered that the solubility of the preferred polydimethylsiloxane in toluene effectively rendered the polydimethylsiloxane inoperable as an effective internal mold release agent.

It was surprisingly discovered that the preferred polydimethylsiloxane became effective as an internal mold release agent only after the polydimethylsiloxane had been rendered incompatible with the toluene constituent of the solvent system of the preferred embodiment, and with the preferred solvent system as a whole.

In this context, incompatible means that the preferred solvent system, and particularly the toluene constituent thereof, and the polydimethylsiloxane must be rendered incapable of blending together into a stable homogeneous mixture. This result has been effected in the preferred embodiment of the lacquer coatings of the present invention by the addition of additional constituents to the toluene constituent of the preferred solvent system. In the presence of the solvent system of the preferred embodiment, the polydimethylsiloxane is rendered incompatible with the solvent system as a whole, due principally, it is believed, to the presence of the acetate, glycol ether, and alcohol constituents, which act to prevent the solubility of the polydimethylsiloxane with the toluene constituent. The polydimethylsiloxane is believed to be placed in a colloidal-dispersion-like state within the lacquer coating.

The number of and the particular constituents of the solvent system are not seen as critical except that they be chosen not only to provide for incompatibility between the solvent system as a whole and the polydimethylsiloxane, but also to provide varying rates of evaporation so the ratio of toluene to the remaining constituents of the solvent system decreases as the entire solvent system evaporates during the drying phase of the lacquer coating of the present invention.

In the preferred solvent system in work completed to date, the slower evaporating solvents prevent the lacquer coating from setting up too rapidly upon use, and the more quickly evaporating solvents provide lower viscosity, and bulk, to the coating. But in addition, the varying evaporation rates of the constituents of the preferred solvent system effectively increase the incompatibility of the polydimethylsiloxane mold release agent and the solvent system as the lacquer coating dries. The more volatile constituents of the solvent system of the preferred embodiment, being toluene, isopropanol, methanol, and ethyl acetate, will evaporate from the drying lacquer coating at faster rates than will the ethylene glycol monobutyl ether, and propoxypropanol, resulting in the the ratio of aromatic to alcoholic, glycol ether, and acetate constituents decreasing as the coating dries. In work completed to date it has also been discovered that reducing or deleting the ethylene glycol monobutyl ether or the propoxypropanol constituents of the preferred solvent system will allow for faster drying times of the lacquer coatings of the present invention without altering the mold release and other performance characteristics of the polydimethylsiloxane.

As the solvent system of the preferred embodiment evaporates during the drying of the lacquer, it is believed the polydimethylsiloxane, which has a specific gravity greater than any constituent of the preferred solvent system, migrates to the boundary between the mold surface and the surface of the lacquer coating. When at the boundary of the lacquer coating and the mold surface, the polydimethylsiloxane is operable to effect complete mold release of the lacquer coating from the article mold surface when curing of the plastic is sufficiently complete to de-mold the article.

The preferred embodiment of the lacquer coatings of the present invention, as constituted utilizing the preferred formulation above, is a clear urethane lacquer coating without significant color pigmentation. The preferred embodiment of the lacquer coatings of the present invention may be pigmented by the incorporation into the coating of acrylic-based pigment dispersions. However, it is critical that any solvents present in a useful pigment dispersion not destroy the polydimethylsiloxane incompatibility with the solvent system of the present invention, and also be compatible with the constituents of the solvent system of the present invention to insure color consistency in the lacquer coatings. For example, in work completed to date, the pigment dispersions commercially available from Nuodex, Inc., of Piscataway, N.J., under the designation Series 844, have proven useful in providing color consistency to the preferred embodiments of the lacquer coatings of the present invention. Nuodex Series 844 dispersions, which include a broad spectrum of colors, may be added to the preferred embodiment of the lacquer coatings of the present invention, preferably in about 2.0 to 15 weight percent of the coatings. Nuodex Series 844 colorants are organic and inorganic pigments in an acrylic resin binder with cellosolve acetate and naphthol spirits as solvents.

As an example, Nuodex Lampblack (Series) 844 (color code) 9955, may be added to the preferred embodiment lacquer coating composition set forth in Table 1 in about 3.00% by weight of the coating to provide a pigmented coating composition with the preferred formulation by weight as follows:

TABLE 2

| Polyester Extended Aliphatic Urethane Elastomer | 6.36% |
| --- | --- |
| Polydimethylsiloxane Fluid | .60% |
| Solvent System (Total): | 93.04% |
| Toluene | 42.13% |
| Iopropanol | 28.63% |
| Methanol | 3.47% |
| Ethylene Glycol Monobutyl Ether | 2.99% |
| Ethyl Acetate | 9.83% |
| Propoxypropanol | 2.99% |
| Pigment Dispersion | 3.00% |

The lacquer coatings of the present invention may be conventionally coated onto the interior surface of an article mold without pre-treatment of the mold with an external mold-release agent. The mold may then be conventionally injected with a polyurethane-based plastic. Upon de-molding, the lacquered polyurethane-based molded article may be re-coated with the lacquer coatings of the present invention of which another lacquer coating of choice without the intermediate step of surface preparation, such as to remove mold release agent residue from the lacquered polyurethane-based molded article.

It has been discovered in work completed to date that the preferred embodiments of the lacquer coatings of the present invention are effectively used as pre-mold coatings on conventional mold surfaces composed of epoxy, aluminum, polypropylene, nickel-plating, polyester, tetrafluoroethylene, aluminum-filled epoxy, spray metals, and silicon rubber, with complete mold release of the lacquer coating without the aid of external mold release agents. The lacquer coatings of the present invention are also believed to be operable on urethane elastomers, urethane rigid molds, and carbon steel molds, as well. Furthermore, the lacquer coatings of the present invention may be utilized as coatings for flexible and rigid polyurethane-molded parts, including integral skin and microcellular flexible polyurethane foams. In addition, it has been discovered that the preferred embodiments of the lacquer coatings of the present invention may be utilized as the second coat over pre-mold coatings on flexible or rigid polyurethane-molded articles in accordance with the disclosure herein, as well as an original top coat on flexible or elastic plastics.

For the purpose of promoting a better understanding and to further illustrate the Applicants' invention, reference will now be made in the Examples below to the preferred products and process of the invention herein disclosed, but no limitation of the scope or breadth of present invention is thereby intended by way of presentation of these specific examples.

EXAMPLE 1

An aluminum injection mold for a rectangular-shaped article was heated to approximately 115° F. The preferred embodiment of the lacquer coating of the present invention which was prepared as disclosed above in the formulated as set forth in Table 2 was conventionally sprayed onto the clean interior surface of the mold to a thickness of approximately 0.4 to 0.6 mil DFT (Dried Film Thickness). The applied lacquer coating was allowed to flash off for approximately one (1) minute. A conventional integral skin polyurethane foam system was then injected into the mold and the mold is closed. The lacquer coating and foam system was allowed to cure for approximately four (4) minutes as the mold was turned in an oven at about 150° F. The article was then de-molded. The lacquer coating completely and cleanly separated from the aluminum mold and was firmly and flawlessly adhered to the surface of the molded foam ball. The foam part was either re-coated with the same lacquer coating with 100% adhesion of the re-coat without prior preparation of the original lacquer coating surface, or was coated or stenciled with similar lacquer coatings, also without prior preparation of the lacquered surface.

EXAMPLE 2

Example 1 was repeated except that the mold surface was epoxy instead of aluminum. The results were substantially the same as Example 1.

EXAMPLE 3

A polypropylene injection mold for a ball-shaped article was heated to approximately 77°-82° F. The preferred embodiment of the lacquer coating of the present invention formulated as set forth in Table 2 was conventionally sprayed onto the clean interior surface of the mold to a thickness of approximately 0.4 to 0.6 mil DFT (Dried Film Thickness). The applied lacquer coating was allowed to flash off for approximately one (1) minute. A conventional microcellular polyurethane foam system was then injected into the mold and the mold was closed. The foam system was allowed to cure for approximately three (3) minutes as the mold was turned in an oven at approximately 110° F. The article was then de-molded. The lacquer coating completely and cleanly separated from the polypropylene mold and was firmly and flawlessly adhered to the surface of the molded foam ball. The foam ball was either re-coated or stenciled as in Example 1 without any preparation of the lacquered surface on the foam ball.

While there has been described above the principles of this invention in connection with specific formulations, it is to be understood that these descriptions are made only by way of example and not as limitations to the scope of the invention.

What is claimed is:

1. An in-mold lacquer coating for a polyurethane-molded article, which coating is mold-releasable without the aid of an external mold release agent and is re-coatable after de-molding without additional surface preparation, comprising a mixture of a fully-reacted aliphatic polyurethane resin, a polydimethylsiloxane fluid, and a solvent system that is incompatible with said polydimethylsiloxane, having toluene, an acetate solvent, a glycol ether solvent, and alcohol solvents as discrete constituents thereof, which constituents have specific gravities less than said polydimethylsiloxane and have varying rates of evaporation such that the ratio of toluene to the acetate, glycol ether, and alcohol solvent constituents in said solvent system decreases as the constituents of said solvent system evaporate.

2. The lacquer coating of claim 1 wherein said fully-reacted aliphatic polyurethane resin includes a polyester extended aliphatic urethane elastomer present in about 3.0–17.00 weight percent.

3. The lacquer coating of claim 2 wherein said polydimethylsiloxane is present in about 0.15 to 1.15 weight percent.

4. The lacquer coating of claim 3 wherein said solvent system includes isopropanol, present in about 15.0 to 50.0 weight percent.

5. The lacquer coating of claim 3 wherein said solvent system includes toluene present in about 15.0% to 60.0 weight percent.

6. The lacquer coating of claim 3 wherein said solvent system includes methanol present in about 1.0 to 30.0 weight percent.

7. The lacquer coating of claim 3 wherein said solvent system includes propoxypropanol present in about 0.0 to 20.0 weight percent.

8. The lacquer coating of claim 3 wherein said solvent system includes ethyl acetate present in about 2.0 to 25.0 weight percent.

9. The lacquer coating of claim 3 wherein said solvent system includes ethylene glycol monobutyl ether present in about 0.0 to 15.0 weight percent.

10. The lacquer coating of claim 1 and further including in said solvent system a pigment dispersion present in about 2.0 to 15.0 weight percent, having dispersion solvents that do not destroy the incompatibility of said solvent system with said polydimethylsiloxane yet are compatible with other constituents of said solvent system so as to provide color consistency in the lacquer coating.

11. An in-mold lacquer, coating for a polyurethane-molded article, which coating is mold-releasable without the aid of an external mold release agent and is re-coatable after de-molding without additional surface preparation, comprising a mixture of a fully-reacted aliphatic polyurethane resin present in about 3.0 to 17.0 weight percent, a polydimethylsiloxane fluid present in about 0.15 to 1.15 weight percent, and a solvent system that is incompatible with said polydimethylsiloxane, having toluene present in about 15.0 to 60.0 weight percent, ethyl acetate present in about 2.0 to 25.0 weight percent, methanol present in about 1.0 to 30.0 wight percent, isopropanol present in about 15.0 to 50.0 weight percent, ethylene glycol monobutyl ether present in about 0.0 to 15.0 weight percent, and propoxypropanol present in about 0.0 to 20.0 weight percent as discrete constituents thereof, which constituents have specific gravities less than said polydimethylsiloxane and have varying rates of evaporation such that the ratio of toluene to the acetate and alcohol solvent constituents in said solvent system decreases as the constituents of said solvent system evaporate.

12. An in-mold lacquer coating for a polyurethane-molded article, which coating is mold-releasable without the aid of an external mold release agent and is re-coatable after de-molding without additional surface preparation, comprising a mixture of a fully-reacted aliphatic polyurethane resin, a polydimethylsiloxane fluid, and a solvent system that is incompatible with said polydimethylsiloxane, having toluene, an acetate solvent, and alcohol solvents as discrete constituents thereof, which constituents have specific gravities less than said polydimethylsiloxane and have varying rates of evaporation such that the ratio of toluene to the acetate and alcohol solvent constituents in said solvent system decreases as the constituents of said solvent system evaporate.

* * * * *

UNITED STATES PATENT AND TRADEMARK OFFICE
CERTIFICATE OF CORRECTION

PATENT NO.　：　　　　5,017,634

DATED　　　：　　　　May 21, 1991

INVENTOR(S) :　　　　Brian J. Falline, et al.

It is certified that error appears in the above-identified patent and that said Letters Patent is hereby corrected as shown below:

In column 9, line 5, after the word "isopropanol" please remove the comma.

In column 9, line 8, please delete "15.0%" and insert in lieu thereof --15.0--.

In column 9, line 30, after the word "lacquer" please remove the comma.

In column 10, line 8, please delete "wight" and insert in lieu thereof --weight--.

Signed and Sealed this

Twenty-second Day of September, 1992

Attest:

DOUGLAS B. COMER

*Attesting Officer*　　　　*Acting Commissioner of Patents and Trademarks*